US011632012B2

(12) United States Patent
Ohba et al.

(10) Patent No.: US 11,632,012 B2
(45) Date of Patent: Apr. 18, 2023

(54) MOTOR AND STRUCTURE OF CONNECTING MOTOR AND MEMBER TO BE CONNECTED

(71) Applicant: MINEBEA MITSUMI Inc., Nagano (JP)

(72) Inventors: Hirofumi Ohba, Kitasaku-gun (JP); Hiroshi Miyazako, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 32 days.

(21) Appl. No.: 17/260,304

(22) PCT Filed: Jul. 9, 2019

(86) PCT No.: PCT/JP2019/027105
§ 371 (c)(1),
(2) Date: Jan. 14, 2021

(87) PCT Pub. No.: WO2020/022047
PCT Pub. Date: Jan. 30, 2020

(65) Prior Publication Data
US 2021/0288548 A1 Sep. 16, 2021

(30) Foreign Application Priority Data
Jul. 24, 2018 (JP) .............................. JP2018-138574

(51) Int. Cl.
*H02K 5/22* (2006.01)
*H02K 11/30* (2016.01)
*H02K 11/00* (2016.01)

(52) U.S. Cl.
CPC .......... *H02K 5/22* (2013.01); *H02K 11/0094* (2013.01); *H02K 11/30* (2016.01)

(58) Field of Classification Search
CPC ........... H02K 5/00; H02K 5/14; H02K 5/145; H02K 5/22; H02K 5/225; H02K 11/00;
(Continued)

(56) References Cited

U.S. PATENT DOCUMENTS

| 4,574,215 A | 3/1986 | Mabuchi |
| 5,218,254 A * | 6/1993 | Someya ................. H02K 5/225 310/71 |

(Continued)

FOREIGN PATENT DOCUMENTS

| JP | 59-30653 U | 2/1984 |
| JP | 07-099754 A | 4/1995 |

(Continued)

OTHER PUBLICATIONS

International Search Report for corresponding International Application No. PCT/JP2019/027105 dated Sep. 24, 2019.
(Continued)

*Primary Examiner* — Tran N Nguyen
(74) *Attorney, Agent, or Firm* — Pearne & Gordon LLP

(57) ABSTRACT

A motor is provided with a bracket, a terminal provided at the bracket, and a frame. The bracket is fixed to the frame. The terminal is electrically connectable to an outside. The bracket is provided with an outer peripheral surface including an opening portion. A part of the terminal is arranged inside the opening portion.

19 Claims, 6 Drawing Sheets

(58) Field of Classification Search
CPC ............. H02K 11/009; H02K 11/0094; H02K 11/02; H02K 11/0263
See application file for complete search history.

(56) References Cited

U.S. PATENT DOCUMENTS

| | | |
|---|---|---|
| 5,600,193 A | 2/1997 | Matsushima et al. |
| 6,603,235 B1 | 8/2003 | Kimura |
| 2019/0020240 A1* | 1/2019 | Yeung .................. H01R 39/38 |

FOREIGN PATENT DOCUMENTS

| | | |
|---|---|---|
| JP | 3523546 B2 | 4/2004 |
| JP | 2006-166646 A | 6/2006 |

OTHER PUBLICATIONS

Written Opinion for corresponding International Application No. PCT/JP2019/027105 dated Sep. 24, 2019.
Japanese Office Action dated Apr. 19, 2022 for corresponding Japanese Application No. 2018-138574 and English translation.

\* cited by examiner

MOTOR AND STRUCTURE OF CONNECTING MOTOR AND MEMBER TO BE CONNECTED

TECHNICAL FIELD

The present invention relates to a motor and a structure of connecting the motor and a member to be connected, and particularly relates to the motor having a terminal connected to a terminal of the member to be connected, and a structure of connecting the motor and the member to be connected.

BACKGROUND ART

It is provided with a motor having a female terminal structure that a terminal for supplying power being accommodated inside a bracket.

Patent Literature 1 below discloses a motor having a female terminal structure and a resistor such as a PTC thermistor is arranged inside a bracket.

CITATION LIST

Patent Document
Patent Literature 1: JP-A-2006-166646

SUMMARY OF THE INVENTION

Technical Problem

In the motor having the female terminal structure, it is difficult to reduce a size of the motor because it is desired that a shape and a size of the terminal is set such that springiness of the terminal becomes large. In order to reduce the size of the motor, it is necessary to arrange the terminal in the motor in a narrow space, and the springiness of the terminal is impaired. If the springiness of the terminal is small, the terminal is easily plastically deformed, which makes it difficult to handle the motor, and therefore, makes it difficult to attach the motor to other members to be connected. If the volume, the size, and the thickness of the bracket formed of a resin are reduced in order to increase a space in which the terminal is to be arranged, the bracket is easily damaged and the motor may be difficult to handle.

The present invention has been made to solve such a problem, and an object thereof is to provide a motor which is small and easy to handle, and a structure of connecting the motor and a member to be connected.

Solution to Problem

According to an aspect of the invention to achieve the above object, a motor includes a bracket, a terminal provided at the bracket, and a frame, the bracket being fixed to the frame, in which the terminal is electrically connectable to the outside, the bracket is provided with an outer peripheral surface including an opening portion, and a part of the terminal is arranged inside the opening portion.

Preferably, the terminal includes a contact portion arranged outside the bracket, and the contact portion is displaceable from the opening portion toward inside of the bracket.

Preferably, a pair of terminals including the terminal, and an electronic component provided at the bracket are further provided, and the electronic component is provided between contact portions of the pair of terminals.

Preferably, the electronic component is a resistor, and a longitudinal direction of the electronic component is a direction from one terminal to the other terminal of the pair of terminals.

According to another aspect of the invention, a structure of connecting a motor and a member to be connected includes the motor according to any one of claims 1 to 4, and the member to be connected having a terminal, in which the terminal of the member to be connected and a terminal of the motor are connected to each other.

Preferably, the member to be connected includes a pair of terminals including the terminal, and the terminal of the motor is in contact with inner surfaces of the pair of terminals of the member to be connected.

According to the present invention, it is possible to provide the motor which is small and easy to handle, and the structure of connecting the motor and the member to be connected.

DESCRIPTION OF EMBODIMENTS

Hereinafter, a motor according to one embodiment of the present invention will be described.

In the following description, a direction parallel to a rotation shaft of the motor may be referred to as a rotation shaft direction. Further, the rotation shaft direction may be referred to as a front-rear direction (a direction in which the bracket is provided as viewed from a frame of the motor is a rear direction). In addition, a specific direction (specifically, described later) in a direction (a radial direction) perpendicular to the rotation shaft of the motor may be referred to as an upper-lower direction, and a direction perpendicular to the front-rear direction and the upper-lower direction may be referred to as a left-right direction. The terms "front and rear", "upper and lower", "right and left", or the like are used herein for convenience in a case where only the motor is focused on, and are not intended to limit a direction of a device on which the motor is mounted or a posture in which the motor is used.

EMBODIMENT

Figure 1:
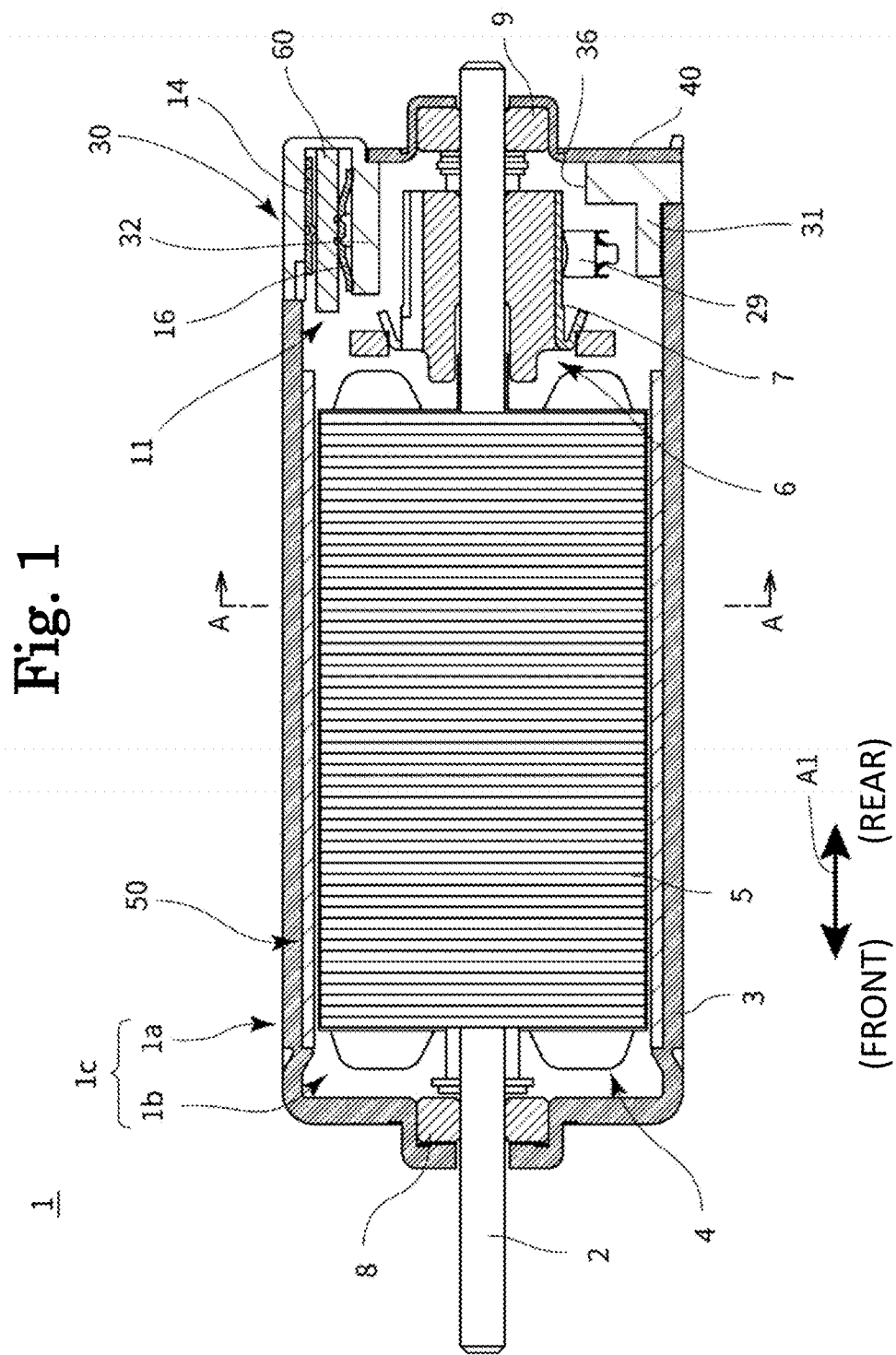
FIG. 1 is a sectional view showing a motor according to one embodiment of the present invention.
Figure 2:
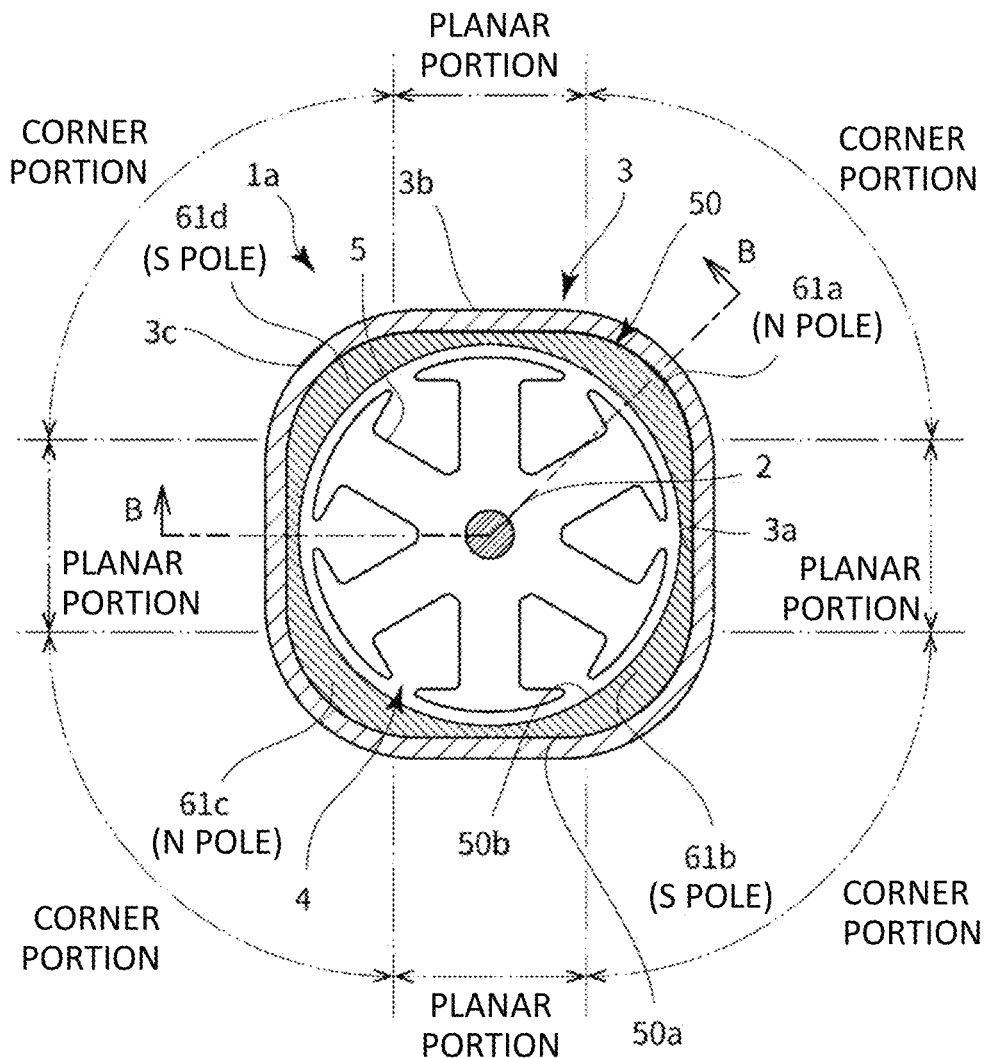
FIG. 2 is a view schematically showing a cross section taken along a line A-A in FIG. 1.
Figure 2:
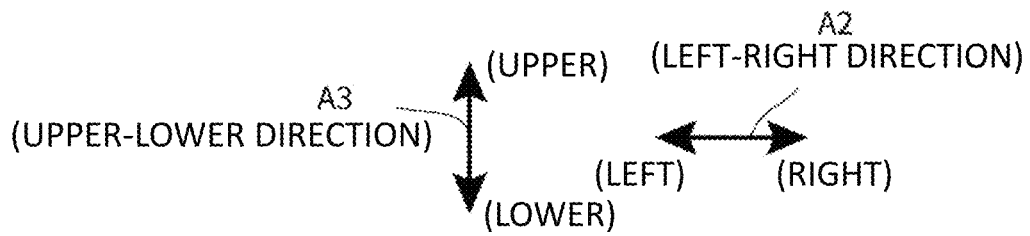

FIG. 1 is a sectional view showing a motor 1 according to one embodiment of the present invention. FIG. 2 is a view schematically showing a cross section taken along a line A-A in FIG. 1.

A cross section shown in FIG. 1 is a cross section taken along a line B-B in FIG. 2. Some constituent members are schematically shown for illustration purposes (for example, a brush 29 described later is not originally located on the cross section shown by the B-B line, but is shown in a state of being rotated around a rotation shaft of the motor 1). In the following drawings, an arrow A1 indicates the rotation shaft direction, that is, the front-rear direction. An arrow A2 indicates the left-right direction (in FIG. 2, left indicates a left direction). An arrow A3 indicates the upper-lower direction (in FIG. 2, upper indicates an upper direction).

The motor 1 includes a frame assembly 1a and an armature assembly 1b which is rotatable with respect to the frame assembly 1a. The motor 1 is a relatively small motor having a width of several tens of millimeters. Here, a width of the motor 1 may be, for example, an interval between a pair of planar portions 3b facing each other across a rotation shaft 2, a dimension in the upper-lower direction or a dimension in the left-right direction of the motor 1, or the maximum outer diameter of the motor 1.

The armature assembly 1b includes a rotation shaft (shaft) 2, an armature 4 attached to the rotation shaft 2, a commutator 6 attached to the rotation shaft 2, and the like. The armature 4 is attached to the rotation shaft 2. The armature 4 includes an armature core 5 having a plurality of salient poles protruding in the radial direction, windings (not shown) wound around the salient poles respectively, and the like. The commutator 6 is provided near one end portion of the rotation shaft 2. The commutator 6 includes a plurality of commutator segments 7 lined in a peripheral direction. Each of the plurality of commutator segments 7 is electrically connected to the winding.

The frame assembly 1a includes a frame 3, a bracket 30, a plate 40, a magnet 50, and the like.

The frame 3 includes a front end portion and a rear end portion, and has a tubular shape covered with a surface serving as the front end portion. That is, the frame 3 has a cup shape with the rear end portion serving as an opening portion. The opening portion at the rear end (right end portion in FIG. 1) of the frame 3 is closed by the plate 40. The armature 4, the commutator 6 and the like of the armature assembly 1b are accommodated in a housing formed by the frame 3 and the plate 40.

The frame 3 is formed by using a magnetic material. As shown in FIG. 2, the frame 3 has a plurality of corner portions 3c and planar portions 3b between two adjacent corner portions 3c. Specifically, the frame 3 has an outer shape having four planar portions 3b and four corner portions 3c. Two planar portions 3b adjacent to each other in the peripheral direction are connected to each other via one corner portion 3c. One of the two planar portions 3b adjacent to each other in the peripheral direction is substantially perpendicular to the other. The corner portion 3c has a rounded shape (R shape). The frame 3 is substantially square in a cross section perpendicular to the rotation shaft 2. The frame 3 is formed in a corner type as a whole. That is, the motor 1 is a small corner type motor. In the following description, the upper-lower direction is a direction perpendicular to the pair of planar portions 3b located so as to sandwich the rotation shaft 2, and the left-right direction is a direction perpendicular to the other pair of planar portions 3b located so as to sandwich the rotation shaft 2.

Returning to FIG. 1, the bracket 30 is arranged inside the plate 40. The bracket 30 is provided at the frame 3. The bracket 30 has two brush portions 11, 21 (right brush portion 11, left brush portion 21) as described later.

The rotation shaft 2 penetrates a front surface of the frame 3. That is, a front end portion of the rotation shaft 2 protrudes from the frame 3 to the outside of the frame 3, and a rear end portion of the rotation shaft 2 protrudes from the plate 40 to the outside of the frame 3. A bearing 8 is held in the center of the front surface of the frame 3. Further, a bearing 9 is held in the center of the plate 40. The rotation shaft 2 is rotatably supported with respect to the frame 3 by these two bearings 8, 9.

As shown in FIG. 2, in the present embodiment, one annular magnet 50 is provided. In other words, the magnet 50 has a tubular shape. The magnet 50 is arranged inside the frame 3. The frame assembly 1a has a cross-sectional structure in which an outer peripheral surface 50a of the magnet 50 is surrounded by the frame 3. An outer peripheral surface of the frame 3 is an outer peripheral surface of the motor 1. A plurality of magnets, each of which has a magnetic pole element, may be used.

The frame 3 has a substantially uniform thickness. That is, an inner surface 3a of the frame 3 is formed in a corner type by connecting a plurality of flat portions formed by the planar portions 3b and a plurality of rounded portions formed by the corner portions 3c.

The magnet 50 is, for example, a bond magnet formed by using a known rare earth material and a known resin material. The magnet 50 is not limited to the bond magnet, and may be, for example, a sintered magnet.

The magnet 50 has magnetic pole elements 61 (N pole 61a, S pole 61b, N pole 61c, S pole 61d). That is, the magnet 50 has the same number of magnetic pole elements 61 as the number of corner portions 3c of the motor 1. The magnetic pole elements 61 are arranged so that polarities thereof are staggered in the peripheral direction. The four magnetic pole elements 61 are arranged at the four corner portions 3c of the frame 3 so that the magnetic pole elements 61 face each other.

The magnet 50 has the outer peripheral surface 50a having a rounded shape along the inner surface 3a of the frame 3 at the corner portion 3c. Further, the magnet 50 has a cylindrical inner peripheral surface 50b. A slight air gap is provided between the inner peripheral surface 50b of the magnet 50 and the armature core 5.

In the present embodiment, the magnet 50 is fixed to the frame 3 with an adhesive or the like. In an assembling process of the motor 1, the magnet 50 is accommodated inside the frame 3 from the opening portion on a rear side of the frame 3. Then, an adhesive is provided between the rear end portion of the magnet 50 and the inner surface 3a of the frame 3, so that the magnet 50 is fixed to the frame 3. Thereafter, the armature assembly 1b is attached to the frame 3, and the bracket 30 and the plate 40 are attached to the frame 3, so that the motor 1 is assembled.

Figure 3:
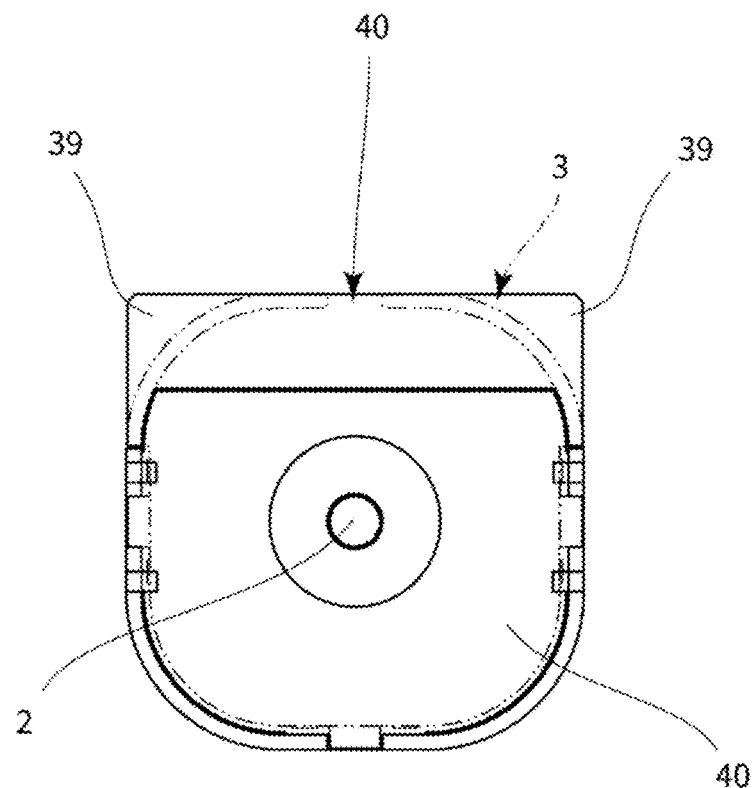
FIG. 3 is a rear view of the motor.
Figure 3:
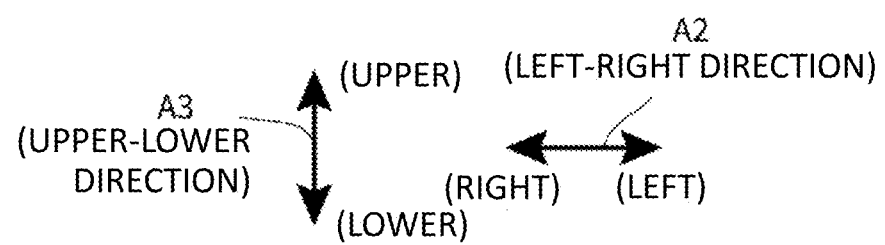

FIG. 3 is a rear view of the motor 1.

In FIG. 3, the broken line is a hidden line indicating the frame 3.

As shown in FIG. 3, when the motor 1 is viewed from the rear side, a part of the bracket 30 is exposed on the rear side at an upper part of the motor 1, and the plate 40 is exposed on the rear side in other parts. In the upper part of the bracket 30, surfaces 39 extending in the left and right are provided on an outer side in the radial direction than an outer peripheral portion of the frame 3 when viewed from the rotation shaft direction.

Figure 4:
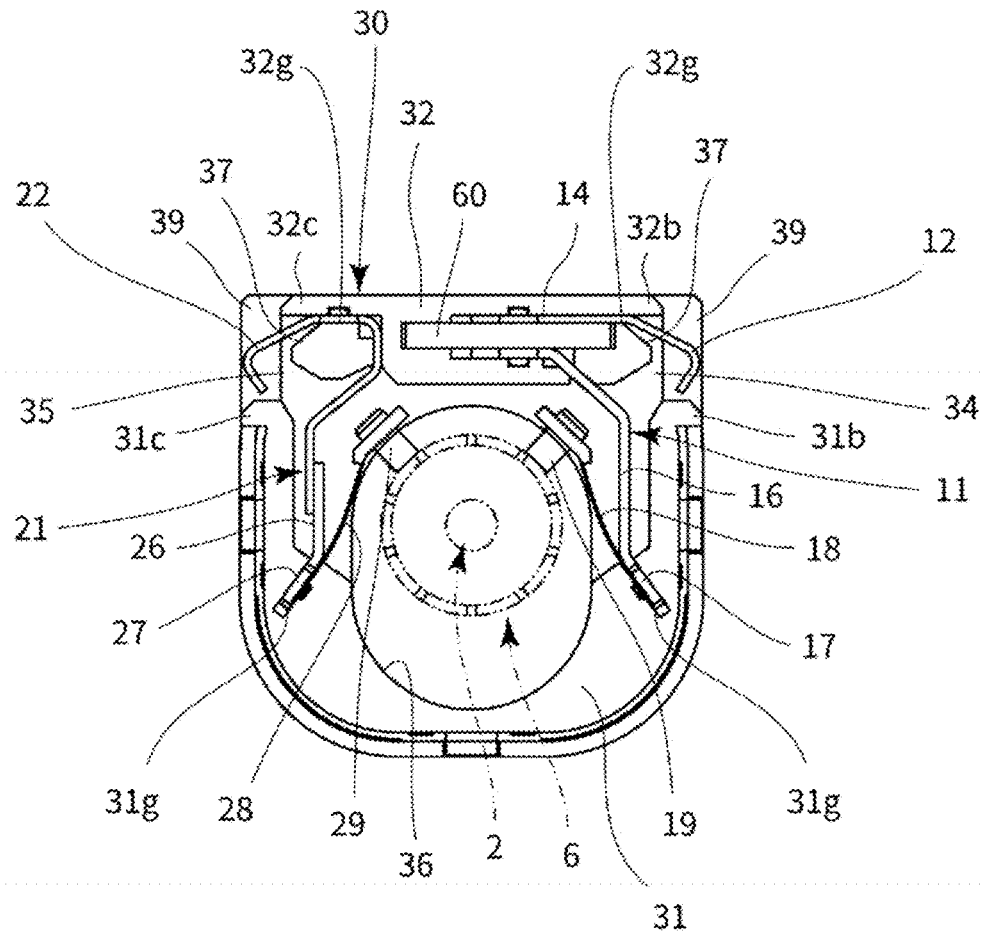
FIG. 4 is a front view showing a bracket to which a brush portion is attached.
Figure 4:
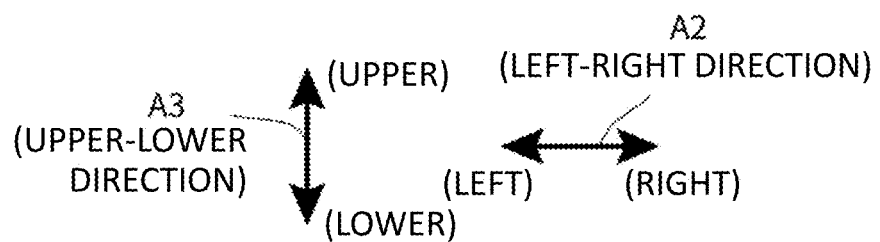

FIG. 4 is a front view showing the bracket 30 to which the brush portions 11, 21 are attached.

In FIG. 4, the brush portions 11, 21 with the commutator 6 being attached are shown, and a position of the commutator 6 is indicated by a two-dot chain line.

The bracket 30 is arranged so as to close the opening portion of the frame 3 of the motor 1, and a part of the bracket 30 is accommodated in the frame 3. That is, the bracket 30 is fixed to the frame 3. The bracket 30 has a first overhanging portion 31 and a second overhanging portion 32 protruding forward (outside the frame 2) from a surface on the rear side (armature side) of the bracket 30. In other words, the parts of the bracket 30 other than the first overhanging portion 31 and the second overhanging portion 32 are recessed rearward from a front end surface of the bracket 30, that is, a front end surface of the first overhanging portion 31 and a front end surface of the second overhanging portion 32. The brush portions 11, 21 are arranged in a region recessed rearward from the front end surface. The rear side of the bracket 30 is closed by a surface perpendicular to the rotation shaft direction, and a through hole 36 through which the rotation shaft 2 passes is formed on the surface. The through hole 36 has an oval shape (elliptical shape, elliptic shape) in which the upper-lower direction is a longitudinal direction.

In the bracket 30, the first overhanging portion 31 foul's outer peripheral surfaces of the right side, the lower side, and the left side of the bracket 30. The first overhanging portion 31 has a curved outer shape extending along the outer peripheral portion of the frame 3, and further has two end portions. Further, the second overhanging portion 32 forms an outer peripheral surface of the upper side of the bracket 30. The second overhanging portion 32 has a linear outer shape extending along the outer peripheral portion of the frame 3 and has two end portions. The first overhanging portion 31 and the second overhanging portion 32 form an annular outer shape having two gaps described later. The gaps described below are formed between one end portion of the first overhanging portion 31 and one end portion of the second overhanging portion 32, and between the other end portion of the first overhanging portion 31 and the other end portion of the second overhanging portion 32.

The bracket 30 is provided with an outer peripheral surface including opening portions 34, 35. That is, there is a gap between an outer peripheral surface of the first overhanging portion 31 and an outer peripheral surface of the second overhanging portion 31, and the gap is the opening portions 34, 35 in the outer peripheral surface. In other words, in an upper right part (one of the four corner portions) of the bracket 30, an upper end portion 31b (one of the two end portions) of the outer peripheral surface of the first overhanging portion 31 and a right end portion 32b (one of the two end portions) of the outer peripheral surface of the second overhanging portion 32 are separated from each other. Between the upper end portion 31b and the right end portion 32b, there is the opening portion 34 on the right side provided at the outer peripheral surface of the bracket 30. Further, in an upper left part of the bracket 30, an upper end portion 31c of the outer peripheral surface of the first overhanging portion 31 and a left end portion 32c of the outer peripheral surface of the second overhanging portion 32 are separated from each other. Between the upper end portion 31c and the left end portion 32c is the opening portion 34 on the left side provided at the outer peripheral surface of the bracket 30.

The right brush portion 11 includes a brush 19 to come into contact with the commutator 6, a first terminal member (an example of a terminal) 14 having a contact portion 12 that can be electrically connected to the outside of the motor 1, a second terminal member 16, and an arm member 18 that electrically connects the second terminal member 16 and the brush 19. The first terminal member 14 and the second terminal member 16 are electrically connected to each other via a resistor (an example of an electronic component) 60 provided at the bracket 30 as described later. The arm member 18 is elastically deformed, and the brush 19 is pressed against an outer peripheral surface of the commutator 6.

In the present embodiment, the resistor 60 is, for example, a plate-shaped PTC thermistor. When the temperature of the motor 1 rises, the resistor 60 cuts off the power supply to the motor 1, so that the motor 1 can be stopped.

The left brush portion 21 includes a brush 29 to come into contact with the commutator 6, a third terminal member (an example of a terminal) 26 having a contact portion 22 that can be electrically connected to the outside of the motor 1, and an arm member 28 that electrically connects the third terminal member 26 and the brush 29. The arm member 28 is elastically deformed, and the brush 29 is pressed against the outer peripheral surface of the commutator 6. In the present embodiment, the third terminal member 26 is configured such that the member on a contact portion 22 side and the member on a side connected to the arm member 28 are connected to each other, but the third terminal member 26 is not limited thereto.

The brush portions 11, 21 are provided at the bracket 30. The first terminal member 14, the second terminal member 16, and the third terminal member 26 are sandwiched between groove portions 31g, 32g formed in the first overhanging portion 31 and the second overhanging portion 32, and are held by the bracket 30. As a result, the brush portions 11, 21 are held with respect to the bracket 30.

Specifically, the first overhanging portion 31 holds a joint portion 17 between the second terminal member 16 and the arm member 18, and a joint portion 27 between the third terminal member 26 and the arm member 28. As a result, base end portions (end portions on a side away from the part where the brushes 19, 29 are attached) of the arm members 18, 28 are firmly supported by the bracket 30, so that the brushes 19, 29 are stably pressed against the commutator 6.

The second overhanging portion 32 holds parts of the first terminal member 14 and the third terminal member 26 on the contact portion 22 side. Further, the second overhanging portion 32 holds the resistor 60 in a state of being sandwiched between the first terminal member 14 and the second terminal member 16. As a result, the right brush portion 11 is held by the bracket 30 in a state of being electrically connected from the contact portion 12 of the first terminal member to the brush 19. The second overhanging portion 32 is provided with the groove portion 32g that is recessed from the front to the rear. The first terminal member 14 and the third terminal member 26 are fitted in the groove portion 32g and held by the bracket 30. A stopper portion 37 formed by a part of the second overhanging portion 32 is formed in a portion inside the opening portions 34, 35 of the bracket 30 in the radial direction. When the first terminal member 14 and the third terminal member 26 come into contact with an external terminal and are displaced as described later, the stopper portion 37 supports the first terminal member 14 and the third terminal member 26 so that a displacement amount of the first terminal member 14 and the third terminal member 26 does not become too large. As a result, the first terminal member 14 and the third terminal member 26 are prevented from being plastically deformed.

In the present embodiment, the resistor 60 is provided between the contact portion 12 of the first terminal member 14 and the contact portion 22 of the third terminal member 26, which are paired on the left and right. The resistor 60 is arranged so that the longitudinal direction is the left-right direction. That is, the longitudinal direction of the resistor 60 is a direction from one toward the other between the first terminal member 14 and the third terminal member 26. The longitudinal direction of the resistor 60 is arranged in the vicinity of an upper surface of the motor 1 in a posture substantially parallel to the upper surface of the motor 1. As a result, a relatively large space for mounting the resistor 60 can be secured inside the motor 1. Therefore, it is possible to manufacture the motor 1 having a relatively small size and capable of rotating with high torque by passing a relatively large current.

The first terminal member 14 is in contact with an upper surface of the resistor 60, and the second terminal member 16 is in contact with a lower surface of the resistor 60. As a result, the resistor 60 is inserted into a path through which a current flows from the contact portion 12 to the brush 19.

Figure 5:
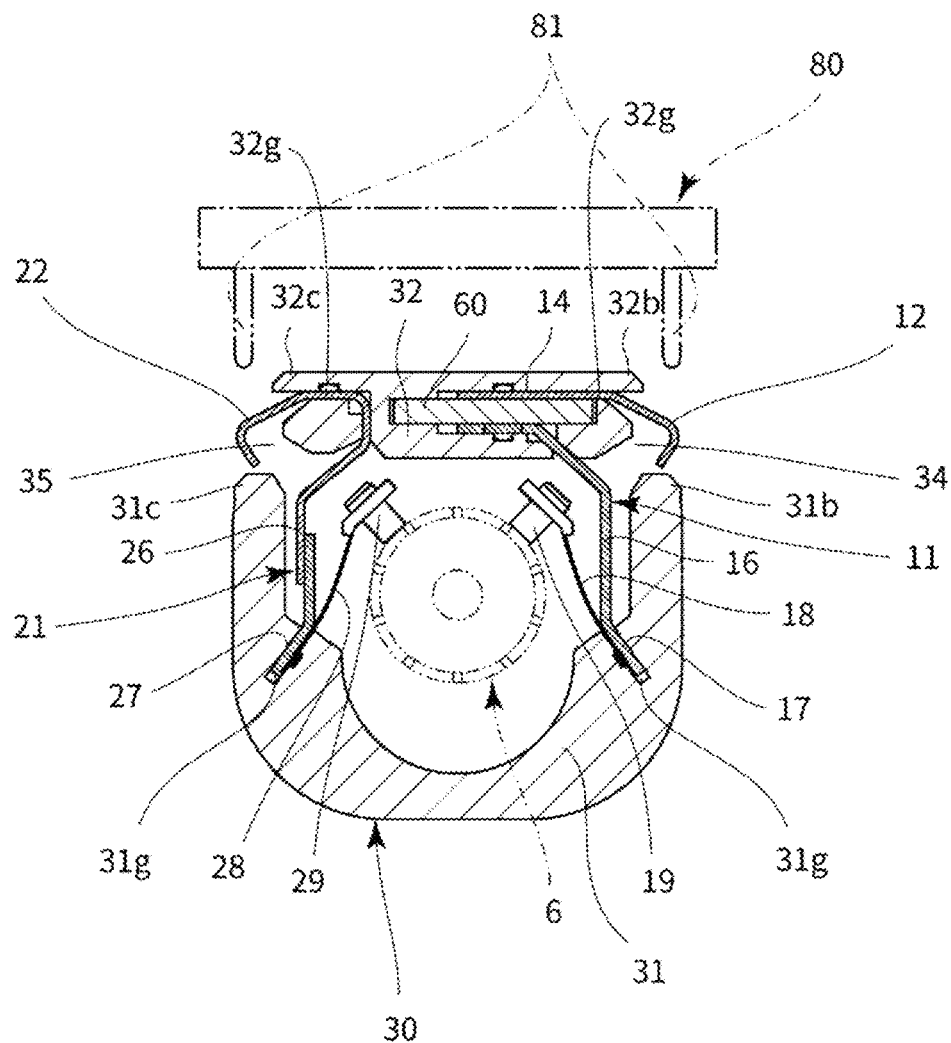
FIG. 5 is a view showing a cross section perpendicular to a rotation shaft of the bracket and the brush portion.
Figure 5:
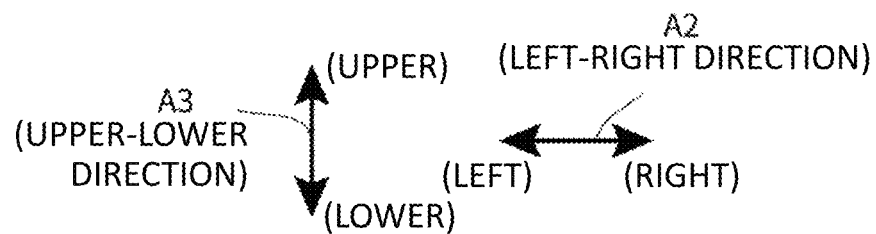
Figure 6:
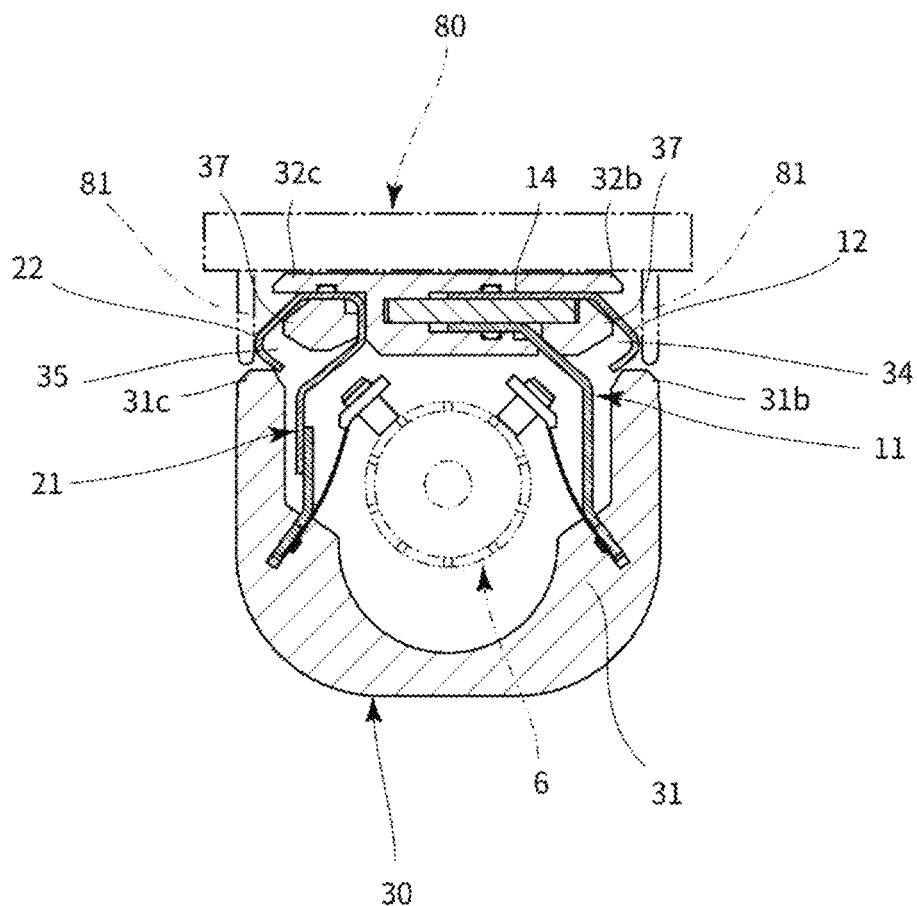
FIG. 6 is a view illustrating the brush portion in a state where a member to be connected is attached.
Figure 6:
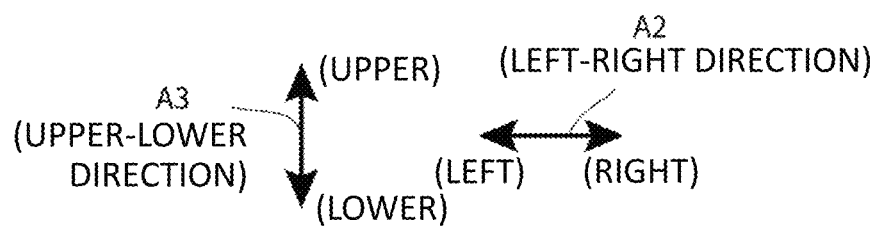

FIG. 5 is a view showing a cross section perpendicular to the rotation shaft 2 of the bracket 30 and the brush portions 11, 21. FIG. 6 is a view illustrating the brush portions 11, 21 in a state where a member to be connected 80 is attached.

In FIGS. 5 and 6, the brushes 19, 29 are shown as they are in the front view.

In the left and right brush portions 11, 21, the contact portions 12, 22 are arranged on the outside of the bracket 30. A part of the first terminal member 14 passes through the inside of the opening portion 34, and the contact portion 12 is located outside the opening portion 34. Further, a part of the third terminal member 26 passes through the inside of the opening portion 35, and the contact portion 22 is located outside the opening portion 35. That is, the part of the first terminal member 14 and the part of the third terminal member 26 are arranged inside the opening portions 34, 35. The arrangement of the contact portions 12, 22 can also be described as follows. That is, a part of the first terminal member 14 and a part of the third terminal member 26 are provided between an outer peripheral wall of the first overhanging portion 31 and an outer peripheral wall of the second overhanging portion 32 arranged in the peripheral direction in the bracket 30.

As shown in FIG. 4, the contact portions 12, 22 are configured so as not to be exposed to the rear side of the motor 1 when viewed from the axial direction. In other words, the contact portions 12, 22 are located inside the two left and right surfaces 39 in the radial direction. As a result, when handling the motor 1, it is possible to prevent unintentional contact of other members with the contact portions 12, 22, and therefore, the motor 1 can be prevented from being damaged.

The member to be connected 80 having two terminals 81 paired on the left and right is attached to the motor 1 configured as described above from the upper side to the lower side when viewed from the motor 1. In FIGS. 5 and 6, the member to be connected 80 is indicated by a two-dot chain line. At this time, as shown in FIG. 6, the two terminals 81 come into contact with the contact portions 12, 22, so that the member to be connected 80 and the motor 1 are electrically connected with each other.

When the terminals 81 are displaced from the upper side to the lower side and come into contact with the contact portions 12, 22, as shown in FIG. 6, the contact portions 12, 22 are displaced from the opening portions 34, 35 toward the inside of the bracket 30, respectively. At this time, the first terminal member 14 and the third terminal member 26 are elastically deformed, and press the contact portions 12, 22 against side surfaces of the terminals 81 respectively. Therefore, even if vibration or the like is applied to the motor 1 or the member to be connected 80, the contact between the terminals 81 and the contact portions 12, 22 is surely maintained. In the member to be connected 80, the pair of terminals 81 are lined. An interval between the surfaces (hereinafter, may be referred to as inner surfaces) of the two terminals 81 facing each other is slightly wider than a width in the left-right direction of the second overhanging portion 32 and narrower than a width in the left-right direction of the motor 1. When the member to be connected 80 is connected to the motor 1, the contact portions 12, 22 can contact the inner surface of respective terminals 81.

In the motor 1 according to the present embodiment, as described above, the terminals 81 of the member to be connected 80 are connected to the contact portion 12 of the first terminal member 14 and the contact portion 22 of the third terminal member 26. According to the structure of connecting the motor 1 and the member to be connected 80, it is possible to configure the motor 1 which is small and easy to handle.

In the motor 1 according to the present embodiment, the distance between the left and right contact portions 12, 22 can be widened. Therefore, even in a relatively small motor, it is possible to secure a relatively wide space in which the first terminal member 14 and the third terminal member 26 are elastically deformed so that the contact portions 12, 22 can be displaced. In other words, since the first terminal member 14 and the third terminal member 26 can be gently deformed to bring the contact portions 12, 22 into contact with the terminals 81, it is possible to prevent the first terminal member 14 and the third terminal member 26 from being plastically deformed even if the terminals 81 are arranged so as to come into contact with the contact portions 12, 22 in an inclined direction. Further, the size of the first overhanging portion 31 and the second overhanging portion 32 of the bracket 30 made of a resin can be secured relatively large. Therefore, the strength of the bracket 30 can be ensured, and damage to the motor 1 can be prevented. Assembling the motor 1 and handling the motor 1 after the assembly can be easily performed.

[Others]

The motor may be configured by partially combining individual feature points of the above embodiment. In the above embodiment, some of the components may not be provided, or some of the components may be configured in other aspects.

An outer peripheral shape of the motor may not be a corner type as in the embodiment described above. For example, the terminal member structure as described above may be used in a small motor having a so-called elliptic (an oval shape formed by connecting two left and right circular arcs and two straight lines) cross section, or the terminal member structure as described above may also be used in a small motor having a round cross section. When the outer peripheral shape of the motor has an elliptic cross section, magnets having two arcuate planar shapes are fixed to the frame, and when the outer peripheral shape of the motor has a round cross section, a magnet having a circular planar shape is fixed to the frame.

The motor configured as described above can be used for various purposes. For example, the present invention may be applied to electronic equipment, or may be used for applications mounted on various vehicles.

It should be understood that the above-described embodiment is merely illustrated in all respect and not restrictive. The scope of the present invention is defined by the claims rather than the description described above, and is intended to include all modifications within the scope and meaning equivalent to the claims.

The present application is based on Japanese Patent Application (No. 2018-138574) filed on Jul. 24, 2018, contents of which are incorporated herein as reference.

LIST OF REFERENCE NUMERALS

1 Motor
1a Frame assembly
1b Armature assembly
2 Rotation shaft
3 Frame
6 Commutator
11, 21 Brush portion
12, 22 Contact portion
14 First terminal member (example of terminal)
26 Third terminal member (example of terminal)
30 Bracket
34, 35 Opening portion
60 Resistor (example of electronic component)
80 Member to be connected
81 Terminal

The invention claimed is:

1. A motor comprising:
a bracket;
a terminal provided at the bracket; and
a frame, the bracket being fixed to the frame,
wherein the terminal is electrically connectable to an outside,
the bracket includes a corner portion in a circumferential direction, an outer peripheral surface including an opening portion, a first overhanging portion and a second overhanging portion, the first overhanging portion and the second overhanging portion forming the outer peripheral surface of the bracket,
the first overhanging portion includes two end portions,
the second overhanging portion includes two end portions,
at the corner portion of the bracket, the opening portion is formed between one of the two end portions of the first overhanging portion and one of the two end portions of the second overhanging portion,
a part of the terminal is arranged between the one of the two end portions of the first overhanging portion and the one of the two end portions of the second overhanging portion, and
the part of the terminal passes through inside of the opening portion.

2. The motor according to claim 1,
wherein the contact portion is displaceable from the opening portion toward inside of the bracket, the contact portion being exposed from the first overhanging portion and the second overhanging portion.

3. The motor according to claim 1, comprising:
a pair of terminals including the terminal; and
an electronic component provided at the bracket,
wherein the electronic component is provided between contact portions of the pair of terminals.

4. The motor according to claim 3,
wherein the electronic component is a resistor, and
a longitudinal direction of the electronic component is a direction from one terminal to the other terminal of the pair of terminals.

5. A structure of connecting a motor and a member to be connected, comprising:
the motor according to claim 1; and
the member to be connected having a terminal,
wherein the terminal of the member to be connected and a terminal of the motor are connected to each other.

6. The structure of connecting the motor and the member to be connected according to claim 5,
wherein the member to be connected includes a pair of terminals including the terminal of the member to be connected, and
the terminal of the motor is in contact with inner surfaces of the pair of terminals of the member to be connected.

7. The motor according to claim 1,
wherein the first overhanging portion includes a curved outer shape,
the second overhanging portion includes a linear outer shape.

8. The motor according to claim 1,
wherein the bracket includes corner portions having a corner portion in a circumferential direction, two opening portions having the opening portion,
the first overhanging portion and the second overhanging portion form the annular outer peripheral surface including the two opening portions.

9. The motor according to claim 7,
wherein the contact portion is displaceable from the opening portion toward inside of the bracket, the contact portion being exposed from the first overhanging portion and the second overhanging portion.

10. A motor comprising:
a bracket;
a pair of terminals including a terminal provided at the bracket;
a frame, the bracket being fixed to the frame; and
an electronic component provided at the bracket,
wherein the terminal is electrically connectable to an outside,
the bracket includes an outer peripheral surface including an opening portion in a circumferential direction, a corner portion in a circumferential direction, a first overhanging portion and a second overhanging portion, the first overhanging portion and the second overhanging portion forming the outer peripheral surface of the bracket,
a part of the terminal is arranged inside the opening portion,
the electronic component is provided between contact portions of the pair of terminals in a circumferential direction,
the electronic component is a resistor,
a longitudinal direction of the electronic component is a direction from one terminal to the other terminal of the pair of terminals in a circumferential direction,
the first overhanging portion includes two end portions,
the second overhanging portion includes two end portions,
at the corner portion of the bracket, the opening portion is formed between one of the two end portions of the first overhanging portion and one of the two end portions of the second overhanging portion, and
a part of the terminal is arranged between the one of the two end portions of the first overhanging portion and the one of the two end portions of the second overhanging portion.

11. The motor according to claim 10,
wherein the first overhanging portion includes a curved outer shape,
the second overhanging portion includes a linear outer shape.

12. A motor comprising:
a bracket;
a pair of terminals including a terminal provided at the bracket;
a frame, the bracket being fixed to the frame; and an electronic component provided at the bracket, wherein the terminal is electrically connectable to an outside, the bracket includes an outer peripheral surface including an opening portion in a circumferential direction, a first overhanging portion and a second overhanging portion, the first overhanging portion and the second overhanging portion forming the outer peripheral surface of the bracket, a part of the terminal is arranged inside the opening portion, the electronic component is provided between contact portions of the pair of terminals in a circumferential direction, the electronic component is a resistor, a longitudinal direction of the electronic component is a direction from one terminal to the other terminal of the pair of terminals in a circumferential direction, the bracket includes corner portions having a corner portion in a circumferential direction, two opening portions having the opening portion, and the first overhanging portion and the second overhanging portion form the annular outer peripheral surface including the two opening portions.

13. A motor comprising:

a bracket;

a pair of terminals including a terminal provided at the bracket;

a frame, the bracket being fixed to the frame; and an electronic component provided at the bracket, wherein the terminal is electrically connectable to an outside, the bracket includes an outer peripheral surface including an opening portion in a circumferential direction, a first overhanging portion and a second overhanging portion, the first overhanging portion and the second overhanging portion forming the outer peripheral surface of the bracket, a part of the terminal is arranged inside the opening portion, the electronic component is provided between contact portions of the pair of terminals in a circumferential direction, the electronic component is a resistor, a longitudinal direction of the electronic component is a direction from one terminal to the other terminal of the pair of terminals in a circumferential direction, and the contact portion is displaceable from the opening portion toward inside of the bracket, the contact portion being exposed from the first overhanging portion and the second overhanging portion.

14. A structure of connecting a motor and a member to be connected, comprising:

the motor according to claim 10; and the member to be connected having a terminal, wherein the terminal of the member to be connected and a terminal of the motor are connected to each other.

15. The structure of connecting the motor and the member to be connected according to claim 14, wherein the member to be connected includes a pair of terminals including the terminal of the member to be connected, and the terminal of the motor is in contact with inner surfaces of the pair of terminals of the member to be connected.

16. A structure of connecting a motor and a member to be connected, comprising:

the motor according to claim 12; and the member to be connected having a terminal, wherein the terminal of the member to be connected and a terminal of the motor are connected to each other.

17. The structure of connecting the motor and the member to be connected according to claim 16, wherein the member to be connected includes a pair of terminals including the terminal of the member to be connected, and the terminal of the motor is in contact with inner surfaces of the pair of terminals of the member to be connected.

18. A structure of connecting a motor and a member to be connected, comprising:

the motor according to claim 13; and the member to be connected having a terminal, wherein the terminal of the member to be connected and a terminal of the motor are connected to each other.

19. The structure of connecting the motor and the member to be connected according to claim 18, wherein the member to be connected includes a pair of terminals including the terminal of the member to be connected, and the terminal of the motor is in contact with inner surfaces of the pair of terminals of the member to be connected.

* * * * *